May 21, 1968
J. M. LEACH
3,384,219
METHOD OF CONVEYING SUBSTANCES
Filed Jan. 9, 1967
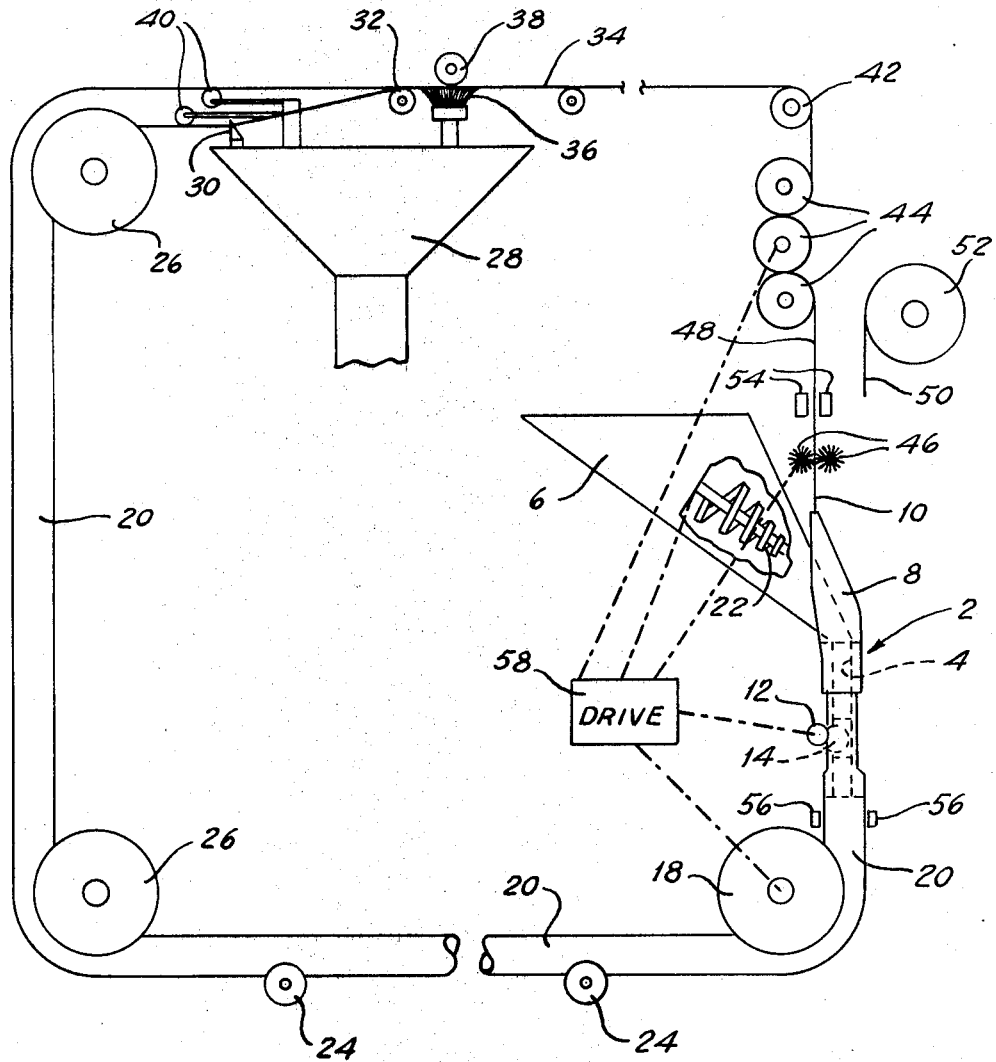
INVENTOR.
John M. Leach 3,384,219
METHOD OF CONVEYING SUBSTANCES
John M. Leach, P.O. Box 341,
Port Jefferson, N.Y. 11777
Filed Jan. 9, 1967, Ser. No. 608,087
10 Claims. (Cl. 198—129)

ABSTRACT OF THE DISCLOSURE

The method comprises continuously forming a sealed tube of plastic material, filling the substance to be conveyed into the tube, moving the tube lengthwise while making all such turns as required in any direction until the desired discharge point is reached, and there slitting the sealed tube to discharge the substance. The plastic material from the slit tube usually will be used to reform the tube for again conveying more of the same or other substance.

Brief summary of the invention

The objects of the present invention are to provide a method of conveying substances, usually in the form of powder, granules, pellets, chunks, sludge, semi-solids, small objects or mixtures thereof from one or more points to one or more other points while the substance is fully enclosed in a sealed casing, and without degrading, classifying, contaminating, humidifying, drying, aerating or otherwise affecting the substance and also preventing the substance from in any way affecting anything else.

It is also an object of the present invention to convey the substances while within a sealed casing without subjecting the substances to forces and obstructions which can impede or in any way interfere with the conveying movement of the substances.

These objects are obtained by suitably forming continuously a sealed wall tube having a circumferentially continuous wall and filling the substance to be conveyed, usually in controlled quantities, into the tube through the opening at the point of formation. Then moving the tube lengthwise or axially along any desired route or path to a selected discharge point where a suitable slitter is located which cuts the tubing wall preferably along the bottom of the tube which permits the substance to empty out of the tube into a vessel or receiving hopper. The sheet formed by the slit tube is preferably directed back to the tube forming area by suitable guide rollers where the slit tube is reused to form the tube again.

The movement of the substance-carrying tube is preferably effected by passing the slit tube between suitably driven pressure rollers which will serve to propel the entire tube and slit tube over the path of movement.

On the horizontal runs the tube is supported at suitable intervals by idler rollers and on the turns the tube is supported by idler sheaves. When relatively long runs are involved, one or more of the idler sheaves may be suitably driven to prevent undue stretching of the plastic tubing.

A plastic material is selected for the tubing which will not react with or otherwise in any way affect the substance to be conveyed so that the use of expensive non-reactive metals is thus avoided.

Brief description of the drawing

The drawing diagrammatically illustrates a side elevational view of one type of apparatus which can be used to perform the method of the present invention.

Detailed description

The plastic tubing which is used to carry the substances in the method of the present invention can be formed in any desired well known manner as by extruding thermoplastic materials into tubular shape or by forming sheeting into tubular form and fastening the edges together to make a strong seam extending along the tube. For reasons of simplicity and economy it is now preferable to utilize the latter tube-forming procedure and such a tube former is diagrammatically shown at 2 in the figure. A tube former of this type which with some modification as to details can be used to form the tube for the purposes of this invention is sold by the Stokes and Smith Division of The FMC Corporation, 633 Third Ave., New York, N.Y.

The tube former comprises a hollow mandrel 4 connected at its top to a hopper 6 which is suitably supported in any desired manner. A guide 8 receives a sheet of thermoplastic sheeting 10 at its upper end, gradually forms it into a cylinder and directs the cylinder onto the mandrel 4 with the edges of the sheet slightly overlapping. The overlapping edges pass between two heated and preferably suitably driven sealing rollers 12 and 14. The roller 14 is located inside of the mandrel 4 and projects through a slot in the wall of the mandrel into contact with the companion roller 12. The roller 14 is suitably encased within the mandrel so as to protect the roller 14 from contact with the substance to be conveyed which passes down through the mandrel on opposite sides of the casing for roller 14. The rollers 12 and 14 heat the thermoplastic material of the sheet 10 until the overlapped ends weld together to form the sheet into a sealed tube having a circumferentially continuous wall and at the same time squeeze the double thickness formed by the overlap into a single thickness which slightly increases the diameter of the tube. In order to accommodate this increased diameter the mandrel is slightly increased in diameter as shown at 16.

The completed tube 20 is passed around a suitably driven sheave 18 to draw it away from the mandrel 4.

The sheet 10 may be formed from any desired thermoplastic material such, for example, as polyethylene, poly vinyl chloride, polypropylene, etc. Because of its economy and ready availability the sheet 10 will usually be formed of polyethylene except where possible reaction between polyethylene and the material being conveyed exists, in which case some inert thermoplastic material will be used.

The thickness of sheet 10 will be selected in accordance with the weight and destructive nature of the substance being conveyed. A sheet having a thickness of 5 mils is usually sufficient, but if the conveyed substance is unusually heavy or has very sharp corners or edges, then a thicker sheet should be used.

The substance to be conveyed is deposited into the hopper 6 and passes into the hollow mandrel 4 and then into the tube 20 which conveys it by movement of the tube 20 lengthwise or axially to the desired discharge point or points. The hopper 6 is provided with a suitably driven auger 22 which both feeds the substance into the hollow mandrel 4 and regulates the rate of feed of the substance so that the tube 20 is not completely filled so as to allow the tubing material to wrinkle on the turns without rupturing the tube but not collapse the tube.

From the driven sheave 18 the loaded tube 20 passes over supporting idler rollers 24 until it is desired to have the tube 20 change direction at which time it is passed around an idler sheave 26. The direction change is shown as 90 degrees straight up in the figure for the sake of convenience only and it is to be understood that the flexibility of the method of conveying of the present invention is such that the moving tube 20 can change direction in any direction and from any plane into another plane at any time and as many times as desired in order to travel a preferred path or route.

At the top of the run as shown in the figure the tube 20 is passed around a second idler sheave 26 and then passes over a receiving hopper 28. In order to discharge the substance into the hopper 28 a slitter knife blade 30 is suitably mounted so as to continuously slit the tube 20 along its bottom side. The tube material is at once passed over a spreader roller 32 which opens out the material into a sheet form 34 which releases all of the material into the hopper 28. A brush 36 and brush backer roller 38 are positioned so as to thoroughly clean the inside of the tube and remove any clinging material or substance being conveyed into the hopper 28.

A pair of spreader rollers 40 are suitably mounted so as to make certain that the tube 20 is held in position for proper slitting of the bottom of the tube without damaging any other part of the tube even though it is only partly filled or even empty.

The reclaimed sheet 34 is passed around an idler roller 42 and then passes between suitably driven pressure rollers 44 which exert pull upon the sheet 34 and thus act as a drive for the entire run of both the tube 20 and sheet 34.

Where the run of the tube 20 is very long, very crooked, includes long upruns, or the substance being conveyed is very heavy, one or more of the sheaves 26 can be driven in any suitable manner as through a fluid coupling so as to provide any slip needed to synchronize the several drives for the tube 20.

After leaving the drive rollers 44 the reclaimed sheet 34 is passed as sheet 10 back through the tube former 2 and is again formed into tube 20 and this cycle is repeated as long as the tube material remains in usable condition.

Sets of suitably driven stiff bristle brushes 46 are positioned so as to thoroughly clean the edges of the sheet 10 so as to improve the quality of the weld at the overlapped edges and thereby insure adequate strength for the tube 20.

It will be noted that because of the squeezing action of the rolls 12 and 14 the reclaimed sheet 34 will have the same width as the original sheet 10.

The life of a sheet 10 will vary with the characteristics of the substance being conveyed but because of the lack of sliding friction and the low power required throughout the method operation one sheet length will last through many cycles. It is to be noted that the heavy load created by the enormous weight of the propelling elements of all other mechanical conveyors is almost completely eliminated because the weight of even several hundred feet of tube 20 would be only a few pounds. Practically all of the power consumed is used to convey substance and not move deadweights.

When a tube 20 does reach the point where leaks are imminent it is very easy and quick to replace the sheet as follows: Stop the movement of the tube 20 and cut off the sheet 34 in the vicinity of 43. Place the lower end of the cut sheet 34 and the free end 50 of a suitably mounted roll 52 of new sheet material between the heated jaws of a conventional heat sealer 54 in overlapped position and fuse the overlapped ends together. Start the unit in operation and feed the spent sheet into a suitable disposal receptacle until the joint just made comes by the first time. Stop the unit, cut off the new sheet 50, cut off the sheet 34 on the upstream side of the joint and heat seal the two ends of the new sheet in the unit as before. Some slack in the area 48 is acceptable.

It is preferable to drive all of the driven elements of tube former 2 by a common drive 58 as shown. In this manner all of the elements will be driven in synchronous relation at the proper speeds to provide for smooth and even formation and movement of the loaded tube 20.

The substance in the vertical run of the loaded tube 20 will normally be moved upwardly by the substance behind it in a non-vertical run of the tube. At the end of a run, however, there will be a tendency for the substance to stand in the vertical run and not be carried along to the discharge point. To overcome this, the unit is stopped when the hollow mandrel has emptied and two heat sealer bars 56 like the bars 54 are brought together on the empty tube 20 to make a very light heat sealed tack which will be just sufficient to move the substance out of the vertical runs and up to the discharge hopper such as 28. The rollers 40 will rip the light tack loose when it reaches them so as to not interfere with subsequent method operations.

The diameter of the tube 20 will be determined by the quantity of substance to be conveyed in any given time.

The method of conveying substances of the present invention is both clean in that it does not form litter and is self cleaning in regard to the sealed tube which saves much maintenance time. Also, it is not necessary to indulge in any cleaning operations between runs of different materials in order to avoid cross batch contamination.

Outside of the sealed tube the other moving parts are subjected to very little wear so that infrequent replacement of the tube now and then is about all of the maintenance of equipment required.

The tube 20 will usually be substantially round but have any other shape in cross section desired.

A simple footage counter, not shown, or any other well known expedient can be employed to sound any signal desired when the life of a given tube as shown by experience has expired.

The foregoing is to be construed as descriptive only and not limitative as many changes can be made without departing from the spirit of the invention.

I claim:

1. A method of conveying substances from a charging point to a spaced discharging point comprising forming a circumferentially continuous, sealed wall tube of plastic material, filling the substance to be conveyed into the tube substantially as it is formed, moving the continuous tube along axially without collapsing to the discharging point, and physically slitting the tube wall at the discharge point to release the substance from the tube.

2. A method of conveying substances as specified in claim 1 in which the tube is formed from thermoplastic sheet material by heat sealing the sheet edges together.

3. A method of conveying substances as specified in claim 1 in which the sheet formed by the slit tube is returned to the tube-forming point and reused to again form the tube.

4. A method of conveying substances as specified in claim 3 in which the tube is moved along axially by a power drive which pulls the sheet material formed by the slit tube in the direction to move the tube.

5. A method of conveying substances as specified in claim 4 in which the tube is formed from thermoplastic sheet material by heat sealing the sheet edges together.

6. A method of conveying substances as specified in claim 1 in which the tube is formed from thermoplastic sheet material by overlapping the sheet edges together and heat sealing them in overlapped position.

7. A method of conveying substances as specified in claim 6 in which the overlapped edges of the sheet while in heated condition are subjected to pressure and squeezed into approximately the thickness of the single sheet whereby all tubes reformed from slit tubes will have substantially the same circumferential measurement.

8. A method of conveying substances as specified in claim 3 in which the tubing material when spent is replaced by cutting off the sheet formed by slitting the tube, attaching a new sheet to the end of the old sheet going into the tube former, and when the joint between the new and old sheets returns to its starting point cutting the sheet in the new sheet area and attaching the ends of the new sheet together.

9. A method of conveying substances as specified in claim 8 in which the sheet ends attachments are made by heat sealing.

10. A method of conveying substances as specified in claim 1 in which the substance is filled into the tube in quantities will not completely fill the tube.

References Cited

UNITED STATES PATENTS 2,145,941   2/1939   Maxfield _____ 53—28
2,607,696   8/1952   Kunz _____ 53—28

RICHARD E. AEGERTER, *Primary Examiner.*

UNITED STATES PATENT OFFICE
CERTIFICATE OF CORRECTION

Patent No. 3,384,219　　　　　　　　　　　　　May 21, 1968

John M. Leach

It is certified that error appears in the above identified patent and that said Letters Patent are hereby corrected as shown below:

Column 5, line 6, after "quantities" insert -- which --.

Signed and sealed this 23rd day of September 1969.

(SEAL)
Attest:

Edward M. Fletcher, Jr.　　　　　　　　WILLIAM E. SCHUYLER, JR.
Attesting Officer　　　　　　　　　　　　　Commissioner of Patents